US012101615B2

(12) United States Patent
O'Brien et al.

(10) Patent No.: US 12,101,615 B2
(45) **Date of Patent: *Sep. 24, 2024**

(54) LOUDSPEAKER DIAPHRAGM

(71) Applicant: B&W Group Ltd., Worthing (GB)

(72) Inventors: Thomas O'Brien, Hove (GB); Martial Andre Robert Rousseau, Saratoga, CA (US)

(73) Assignee: B&W Group Ltd., Worthing (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,041

(22) Filed: Jul. 10, 2023

(65) Prior Publication Data

US 2024/0048910 A1 Feb. 8, 2024

Related U.S. Application Data

(63) Continuation of application No. 17/852,492, filed on Jun. 29, 2022, now Pat. No. 11,743,651, which is a continuation of application No. 16/730,369, filed on Dec. 30, 2019, now Pat. No. 11,395,069, which is a continuation of application No. 16/427,261, filed on May 30, 2019, now Pat. No. 10,547,949, which is a (Continued)

(30) Foreign Application Priority Data

May 29, 2015 (GB) ..................................... 1509347

(51) Int. Cl.

*H04R 7/12* (2006.01)
*H04R 1/28* (2006.01)
*H04R 31/00* (2006.01)

(52) U.S. Cl.

CPC ............. *H04R 7/125* (2013.01); *H04R 1/288* (2013.01); *H04R 31/003* (2013.01); *H04R 2307/027* (2013.01); *H04R 2307/029* (2013.01)

(58) Field of Classification Search

CPC ...... H04R 7/125; H04R 1/288; H04R 31/003; H04R 2307/027; H04R 2307/025; H04R 2307/029

USPC ........................................................ 381/354

See application file for complete search history.

(56) References Cited

U.S. PATENT DOCUMENTS 4,552,243 A * 11/1985 Melillo .................... H04R 7/02 181/170

8,442,261 B2 * 5/2013 Kamimura ............. H04R 7/127 181/165

(Continued)

FOREIGN PATENT DOCUMENTS

JP 52012823 1/1977
JP H11205521 A 7/1999

(Continued)

*Primary Examiner* — Sean H Nguyen

(74) *Attorney, Agent, or Firm* — Nieves IP Law Group, LLC; Peter A. Nieves

(57) ABSTRACT

A loudspeaker diaphragm (12) comprising a woven fibre body supports damping material (25), for example PVA polymer, on a rearward-facing surface (24). The woven fibre body may be formed of lengths (14) non-metallic fibre material (for example glass fibre) coating with a thin metal coating (32). The mass of the layer of damping material (25) may be less than the mass of the woven fibre body. An attractive sparkly looking loudspeaker diaphragm (12) may thus be provided which damps undesirable vibration whilst providing a flatter frequency-response curve (50).

22 Claims, 6 Drawing Sheets

Related U.S. Application Data continuation-in-part of application No. 15/577,333, filed as application No. PCT/GB2016/051568 on May 27, 2016, now Pat. No. 10,390,141.

(56) References Cited

U.S. PATENT DOCUMENTS

| | | | | |
|---|---|---|---|---|
| 2006/0281381 | A1* | 12/2006 | Fujitani | B32B 27/40 156/221 |
| 2007/0177758 | A1* | 8/2007 | Ohara | H04R 7/12 381/428 |
| 2015/0317972 | A1* | 11/2015 | De La Nouvelle | G10K 13/00 181/291 |
| 2016/0295329 | A1* | 10/2016 | Chang | H04R 7/127 |

FOREIGN PATENT DOCUMENTS

| | | | |
|---|---|---|---|
| JP | 2014097645 | A | 5/2014 |
| JP | 2015043548 | A | 3/2015 |

* cited by examiner

LOUDSPEAKER DIAPHRAGM

CROSS REFERENCE TO RELATED APPLICATIONS

This application is a continuation of U.S. patent application Ser. No. 17/852,492, "Loudspeaker Diaphragm", filed on Jun. 29, 2022, which is a continuation of U.S. patent application Ser. No. 16/730,369, "Loudspeaker Diaphragm", filed on Dec. 30, 2019, which is a continuation of U.S. patent application Ser. No. 16/427,261, "Loudspeaker Diaphragm," by Thomas O'Brien and Martial André Robert Rousseau, filed on May 30, 2019, is a continuation-in-part of U.S. patent application Ser. No. 15/577,333, "Loudspeaker Diaphragm," by Thomas O'Brien and Martial André Robert Rousseau, filed on Nov. 27, 2017, and is a national phase entry of International Application No. PCT/GB2016/051568, "Loudspeaker Diaphragm," by Thomas O'Brien and Martial André Robert Rousseau, filed on May 27, 2016, which claims priority to U.K. Patent Application No. 1509347.9, "Loudspeaker Diaphragm," by Thomas O'Brien and Martial André Robert Rousseau, filed on May 29, 2015, the contents of all of which are herein incorporated by reference.

This application is related to U.S. patent application Ser. No. 16/711,429, "Loudspeaker Diaphragm," by Thomas O'Brien and Martial André Robert Rousseau, filed on Dec. 12, 2019.

FIELD OF THE INVENTION

The present invention concerns a loudspeaker diaphragm and a method for making such a diaphragm. More particularly, but not exclusively, this invention concerns a loudspeaker diaphragm comprising a woven fibre body supporting a damping material. The invention also concerns a loudspeaker drive unit and a loudspeaker enclosure.

BACKGROUND OF THE INVENTION

The present invention concerns a loudspeaker diaphragm and a method for making such a diaphragm. More particularly, but not exclusively, this invention concerns a loudspeaker diaphragm comprising a woven fibre body supporting a damping material. The invention also concerns a loudspeaker drive unit and a loudspeaker enclosure.

GB 1 491 080 (by B&W Loudspeakers Limited—or "B & W") discloses a loudspeaker diaphragm made from an open mesh woven fibre material, for example Kevlar®, so stiffened with a thermosetting resin that spaces are left between adjacent fibres. The spaces are partially filled with a damping material, such as PVA (polyvinyl-acetate) emulsion. The spaces between the threads of the fabric enable good bonding between the PVA emulsion and the woven fibre material. The UK company, Bowers & Wilkins have commercialised a mid-range drive unit incorporating a loudspeaker diaphragm made from a woven Kevlar® fabric, stiffened with resin, and coated with PVA. The PVA material is brushed onto the woven fibre material in one or more layers, typically resulting in the PVA material forming about 10% to 15% of the total mass of the loudspeaker diaphragm. The result is a semi-flexible cone (hereinafter, "B&W's Kevlar cone"), which exhibits useful break-up behaviour, less coloration, and more even dispersion of the sound emitted, as will now be explained in further detail.

Continued vibration of a loudspeaker diaphragm, independent of the applied input signal, can lead to "time-smearing"—a form of coloration—and resultant impairment of the clarity of the sound produced in response to a given input signal, and of the accurate reproduction of the sound from the input signal. The PVA material provides damping, but the non-isotropic properties of B&W's Kevlar cone are cited as important: being woven, the mechanical properties of B&W's Kevlar cone are different depending on the angle to the direction of the fibres. Sound waves travel through the material of the cone at different spends depending on the direction of travel. As such, reflections of sound waves travelling across the body of B&W's Kevlar cone, happen at different times around the edge of the cone, leading to a less symmetrical pattern of sound waves, and reduced impact on sound from formation of standing waves. Less sound is received by the listener than would otherwise result from delayed energy being radiated by the cone. As a result, there is less of the undesirable "time-smearing" noise. The cone thus produces emitted sounds which are significantly clearer and which can deliver finer detail. Design details stated as providing control over the quality of sound reproduction include the type of weave, the cone geometry, and the choice of type of stiffening resins and damping materials.

B&W's Kevlar cone is used in many of B&W's products, it being widely used in the mid-range drive units supplied in B&W's loudspeakers. Kevlar has not only the above-mentioned beneficial properties but conveniently has an attractive and distinctive appearance, which makes it suitable for use as the forward-facing sound-emitting surface of the diaphragm of a loudspeaker drive-unit. It is however an expensive material and it would be useful to have an alternative material for use that could be employed in a manner that provides similar or better acoustic performance. It would also be beneficial for such a material, not only to fulfil the technical performance and satisfy the technical characteristics required of it, but also to have an outward appearance that is suitable for use within a hi-fi context.

The present invention seeks to mitigate one or more of the above-mentioned problems. Alternatively or additionally, the present invention seeks to provide an improved loudspeaker diaphragm. Alternatively or additionally, the present invention seeks to provide an alternative to the B&W's Kevlar cone as described above, with substantially the same or better acoustic performance.

SUMMARY OF THE INVENTION

The present invention provides a loudspeaker diaphragm comprising a woven fibre body having a forward-facing sound-radiating surface and a rearward-facing surface which supports a damping material, which preferably forms the shape of the diaphragm. According to one important, but not necessarily essential, aspect of the present invention the woven fibre body is formed of metal coated non-metallic fibre material, preferably one which when illuminated with light, whether natural light or light from a different source, the diaphragm appears to have a sparkly appearance, for example as perceived when viewed with the naked eye.

It is possible to make a loudspeaker diaphragm with such a metal-coated non-metallic fibre material that performs as well as, if not better than, B&W's Kevlar cone with the potential benefit of not needing to use Kevlar, which is expensive and which has limits on how it can be presented (particularly having in mind that the natural colour of Kevlar is a creamy-yellow colour). Not only does the present invention have the benefit of providing an alternative to the Kevlar fibre cones of the prior art, it proposes a loudspeaker diaphragm with a particularly distinctive and attractive appearance. The lengths of fibre that are woven to form the woven fibre body weave in and out of each other such that the surface of the diaphragm has a non-smooth geometry at the local level (for example at the micrometre to millimetre scale). The non-smooth geometry means that the metal-coating will reflect incident light, received at a given angle of incidence (relative to the axis of the diaphragm or the forward-facing direction), in significantly different directions as between relatively close locations on the diaphragm. It is preferred that the outer metallic surface is predominately a specularly reflective surface, for example such that the surface has a mirror-like appearance as opposed to a more matt-like appearance. Thus, when illuminated with light, whether natural light or light from a different source, the diaphragm may have an attractive sparkly or otherwise unusually striking appearance. Moreover, it may be that the damping material may have an unattractive appearance, and/or the potential to discolour over time. The use of a loudspeaker diaphragm having a sparkly visually striking forward facing surface may have the added benefit of masking, or at least providing a distraction from, the possibly unattractive appearance of the damping material behind that might otherwise be more noticeable. In other aspects of the invention, the woven fibre body may be formed of a material not being in the form of a metal-coated non-metallic fibre material, yet still provide benefits.

According to another important, but not necessarily essential, aspect of the present invention, the mass of the layer of damping material is more than 25% greater than the mass of the woven fibre body. (However, in other embodiments, the mass of the layer of damping material may be more than 5% less than the mass of the woven fibre body.) It has been found, surprisingly, that having a relatively high ratio of mass of the layer of damping material to the mass of the woven fibre body can provide improved acoustic performance in embodiments of the present invention. In an embodiment of the present invention, concerning a 6 inch drive unit, the mass of the woven fibre body and the mass of the damping material might be 3 grams and 5 grams respectively. By way of comparison, the mass of the woven fibre body and the mass of the damping material of a 6 inch B&W's Kevlar cone (of the prior art) might be 6 grams and 1 gram, respectively. B&W's Kevlar cone thus has a certain minimum level of stiffness and structural support provided by the woven fibre body, with the damping material being added to provide damping rather than structure. In embodiments of this aspect of the present invention, the properties of the damping material play a much greater role in the physical structure and acoustic performance of the diaphragm with the woven fibre body playing a lesser role. One role, which may be the primary role, of the woven fibre body of the present invention may be that it acts as a substrate, or skeleton structure, for supporting the damping material that forms the bulk of the diaphragm. One role, which may be a secondary role, of the woven fibre body may be that it provides an aesthetically pleasing forward-facing surface.

As mentioned above, it has been found that having a relatively large amount of damping material, and much larger than hitherto suggested in the context of B&W's Kevlar cone design (which has a woven fibre body having a rearward-facing surface supporting only a relatively thin layer of damping material), may be surprisingly beneficial. The mass of the layer of damping material may be more than 50% greater than the mass of the woven fibre body. It may be that the layer of the damping material is at least twice as massive as the woven fibre body. (However, in other embodiments, the layer of the damping material may be more than 5% less massive than the woven fibre body.) The mass of the layer of damping material may for example be in the range of 100 to 500 g/m$^2$. The mass of the woven fibre body may be 100 to 600 g/m$^2$ or between 25% and 120% of the mass of the layer of damping material. In some embodiments, for a 145 mm diameter cone, the woven fibre body mass may be around 2.5 to 3.5 g and the damping mass may be around 2.5 to 3.1 g.

It may be that the thickness of the layer of damping material is greater than the thickness of the woven fibre body. The thickness of the layer of damping material may for example be greater than 0.2 mm. The thickness of the layer of damping material may be less than 0.5 mm.

It may be that the woven fibre body forms the forward-facing sound-radiating surface of the diaphragm. It may be that the layer of damping material forms the rearward-facing surface of the diaphragm. Thus, it may be that there is no woven fibre body on the rearward-facing surface of the diaphragm, as might be the case if the diaphragm were in the form of a sandwich structure.

It may be that the damping layer is a unitary structure. It may be that the damping layer is a monolithic structure having uniform composition. Thus, the damping layer may be such that it has little, and preferably no, fibre material within its structure.

As mentioned above, in certain embodiments, it may be that the woven fibre body is made from non-metallic fibre material. It may be that the woven fibre body is formed of metal-coated fibres. In the case where the woven fibre body is formed of metal-coated fibres the thickness of the metal-coating may be less than 10 microns thick. It may be that the metal-coating is less than 1 micron thick.

The woven fibre body may comprise fibres and a resin, for example fibres that are integrated (at least partially) within a cured resin matrix. The resin may be a phenolic resin. The resin may contribute to the stiffness of the woven fibre body. The resin may thus be in the form of a stiffening resin. The fibre body and resin may be in the form of a composite material structure.

In the case where the woven fibre body is formed of fibres which are at least partly metallic, the metallic parts may be protected by a layer of lacquer. A layer of lacquer may contribute to the stiffness of the woven fibre material. When the fibre material is also stiffened with the use of a stiffening resin in addition to a lacquer, it may then be possible to use less stiffening resin per unit area of the woven fibre material. The lacquer is preferably translucent, and may be clear in colour, for example being substantially transparent. It may be that the mass per unit area of the resin is greater than the mass per unit area of the lacquer but by a factor of 5 or less. The mass per unit area of the resin and lacquer may together be in the range of 20 to 60 g/m$^2$.

The diaphragm may be flat in shape. The diaphragm may have a generally conical-shape. The diaphragm may have a diameter of at least about 50 mm. The diaphragm may have a diameter of no greater than about 200 mm.

The woven fibre body may be formed of a glass fibre material. Glass fibre is readily available and relatively inexpensive but is typically transparent, thus allowing light to be transmitted from one side of the woven fibre material to the other via the glass. It may be disadvantageous to have light pass to and/or from damping material on the rearward-facing surface of the woven fibre body, and in such cases glass fibre might be perceived as not representing the best choice of material. However, if such glass fibre material is coated with an opaque coating such as that provided by the metal coating proposed above, such potential disadvantages may be reduced or overcome.

The woven fibre body may have a relatively regular weave. For example the density of thread length per unit area may be substantially constant across the surface of the diaphragm. The collection of fibres that together form a single length of material that weaves in and out of other such lengths of material may itself be considered as a single thread in this context.

The woven nature of the fibre body of the diaphragm may be such that lengths of material weave in and out of each other to form the body. There may be gaps between adjacent lengths of material. The woven fibre body may define an array of such gaps. It will be understood that the array of gaps will typically have a relatively complicated geometry in three dimensions and will typically not be a regular array. Each gap, typically formed by a pair of adjacent fibre crossing another pair of adjacent fibres, may have a maximum dimension that is at least 50 microns, and preferably at least 100 microns. It may be that the damping material fills substantially all of the gaps so defined.

The damping material may have a mechanical loss factor of at least 0.25 at a frequency between 1 kHz and 8 kHz. For example, the damping material may have a mechanical loss factor of at least 0.5 at a frequency between 3 kHz and 6 kHz. The loss factor may be greater than 0.75 at a frequency within the range of operational frequencies of the diaphragm. Such a damping material may provide particularly strong damping at frequencies at which the vibration of the diaphragm might otherwise start to break up (i.e. deviate from simple piston-like behaviour). The damping material may be an elastomeric material. The damping material may be in the form of a synthetic resin. The damping material may be in the form of a suitable polymer. A vinyl polymer may be suitable. The damping material may be a highly damped polymer material, such as a PVA (Polyvinyl Acetate) material. The discoloration of such materials over time has meant that their use in hi-fi loudspeaker diaphragms would normally be limited to areas which are not visible in normal use. There may therefore be embodiments of the invention in which the damping material is usefully masked, hidden or otherwise disguised by a metal-coated fibre material body.

It may be that the thickness of the damping material is substantially constant across, the majority of, if not substantially the entire extent of, the rearward-facing surface on which it is supported. It will be appreciated that small changes in thickness resulting from the woven nature of the fibres and any gaps in the weave are to be discounted in this context, as it is the thickness of the damping layer as viewed relative to the macroscopic shape of the diaphragm which is relevant (thus smoothing out/ignoring the change in geometry of the diaphragm contributed by the woven nature of the fibres). The thickness of the damping material may however be chosen to be thicker in certain locations, for example at or in the regions of the nodes/nodal lines of the vibration at which breakup is observed. Thus, it may be that there is an area representing more than 10% of the area of the region of contact between the rearward-facing surface and the damping material in which the (mean) average thickness of the damping material is more than 10% greater than the (mean) average thickness of the damping material in a different area of contact between the rearward-facing surface and the damping material (also representing more than 10% of the total area of contact). It may be that the thickness of the damping material varies monotonically with increasing distance in a radial direction across at least 5% of the diameter of the diaphragm.

According to another aspect of the invention there is also provided a method of making a loudspeaker diaphragm, for example for use as a loudspeaker diaphragm as described or claimed herein. Such a method may comprise a step of applying liquid damping material to a woven fibre body, which may be caused to spin. Spinning the woven fibre body may assist in promoting even application of the liquid damping material. The woven fibre body may be spun at a relatively low angular speed, for example less than 100 rpm when initially depositing the liquid damping material onto the rearward-facing surface (for example in a spiral pattern). The woven fibre body may be spun at relatively high angular speed, for example at a speed between about 100 rpm and 1000 rpm) when subsequently spinning the woven fibre body to promote even application of the liquid damping material over the rearward-facing surface. The woven fibre body may be spun at more than 500 rpm during the step of spinning at a relatively high angular speed. The process of spinning at a relatively high angular speed may comprise a first step of spinning at a first speed of between about 100 rpm and 500 rpm and then a second step of spinning at a second angular speed, which is more than 50% faster than the first angular speed and is preferably higher than 500 rpm.

There may be a step of curing the damping material so that it transforms from liquid material to solid (non-flowing) material. The liquid damping material may be applied in the form of an emulsion, for example a water-based emulsion. The step of curing the damping material may be carried out at a temperature less than 100 degrees C. Curing at relatively low temperature may be important when the damping material comprises water, such as a water-based emulsion of PVA material. A PVA layer may be cured at between 40 and 80 degrees C.

The method may be performed to produce a loudspeaker diaphragm having a woven fibre body which is formed of non-metallic fibre material. The method of making the loudspeaker diaphragm may comprise a step of applying a metal coating, for example, to a non-metallic fibre material of a woven fibre body. The step of applying the metal coating may be performed by means of a vapour deposition method.

There is also provided, according to another aspect of the invention, a loudspeaker drive unit comprising a diaphragm according to any aspect of the invention as claimed or described herein. Such a loudspeaker drive unit may be configured for use as a midrange drive unit for a hi-fi loudspeaker. The loudspeaker drive unit may have a range of operation over a band of frequencies that includes a frequency of 20 Hz. The loudspeaker drive unit may have a range of operation over a band of frequencies that extends as high as at least 6 kHz, and possibly as high as at least 8 kHz. For example, the range of operation may encompass 200 Hz to 5 kHz. When the diaphragm of the loudspeaker drive unit has a diameter of less than 80 mm it may be that the drive unit has a range of operation over a band of frequencies that extends as high as at least 10 kHz, and possibly as high as at least 15 kHz.

There is also provided, according to yet another aspect of the invention, a loudspeaker enclosure comprising a loudspeaker drive unit according to any aspect of the invention as claimed or described herein.

According to another aspect of the invention there is also provided a method of making a loudspeaker diaphragm, for example for use as a loudspeaker diaphragm as described or claimed herein. Such a method may comprise a step of fabricating the loudspeaker diaphragm using a composite structure with glass fibre weave and a damping material. For example, the glass fibre weave may include EO823, and the damping material may include a polymer such as PVA. The glass fibre weave may behave as a rigid piston up to 1 kHz for a 5 or 6 inch diameter loudspeaker diaphragm. Above this frequency, the loudspeaker diaphragm may exhibit mechanical resonances. In some embodiments, the material mass ratio in the loudspeaker diaphragm may be 20-40% glass fibre weave and 60-80% PVA. Note that the stiffness of the composite structure may be chosen to minimise the acoustic radiation of the mechanical resonances.

In some embodiments, the glass fibre weave is replaced with or supplemented by one or more of: glass, Kevlar, quartz fibre, and a woven carbon fibre composite. Moreover, in some embodiments the damping material includes a composite of PVA (and, more generally, a polymer) and microspheres. For example, the microspheres may include one or more of: glass, ceramic, diamond, diamond SP3, aluminium oxide, and boron carbide. The composite damping material may include a volume ratio of 35-55% PVA to 45-65% microspheres. Furthermore, the microspheres may have a diameter between 20-60 μm. Note that a volume density of the composite of PVA and the microspheres may be between 0.6 and 0.8, a thickness between 0.2 and 0.4 mm, and may result in a mixture of shear and tensile train in the PVA during deformation. Additionally, the composite of PVA and the microspheres may be fabricated by mixing a PVA emulsion with the microspheres, and then brushing or spraying the mix on a substrate. The composite of the PVA and the microspheres may have a third harmonic distortion that is less than −50 dB, such as −60 dB.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
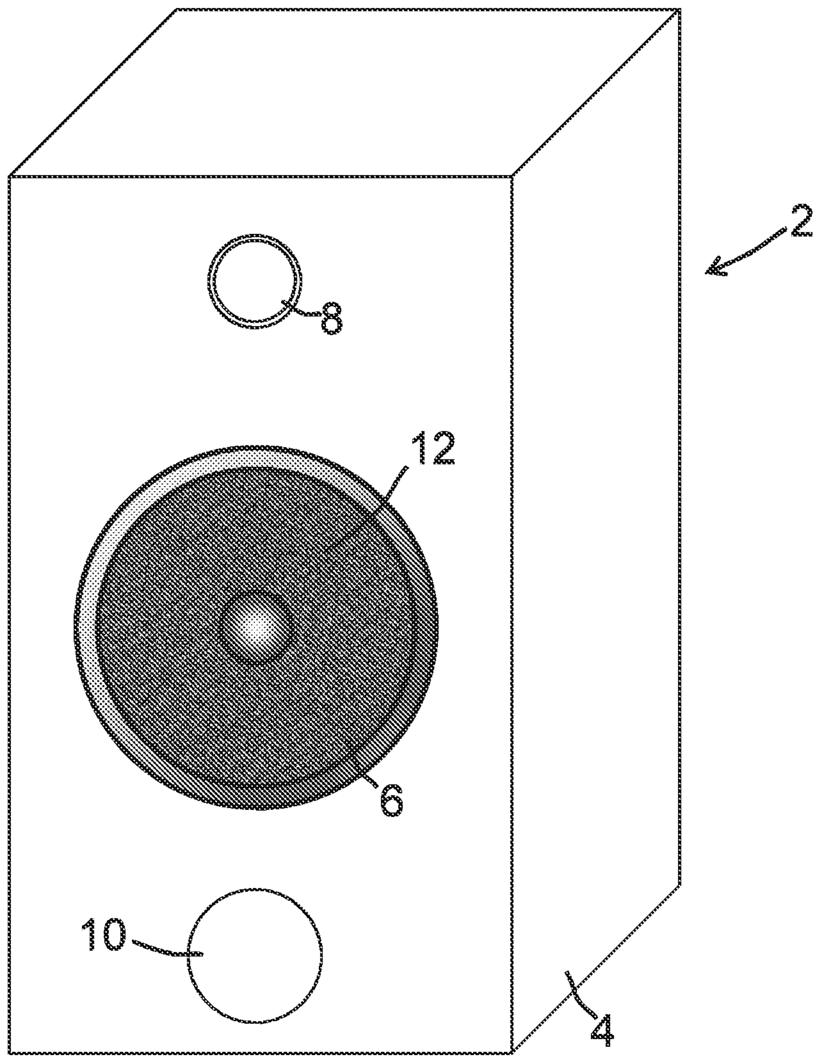
FIG. 1 is a perspective view of a loudspeaker enclosure incorporating a woven fibre cone according to a first embodiment of the invention.
Figure 2:
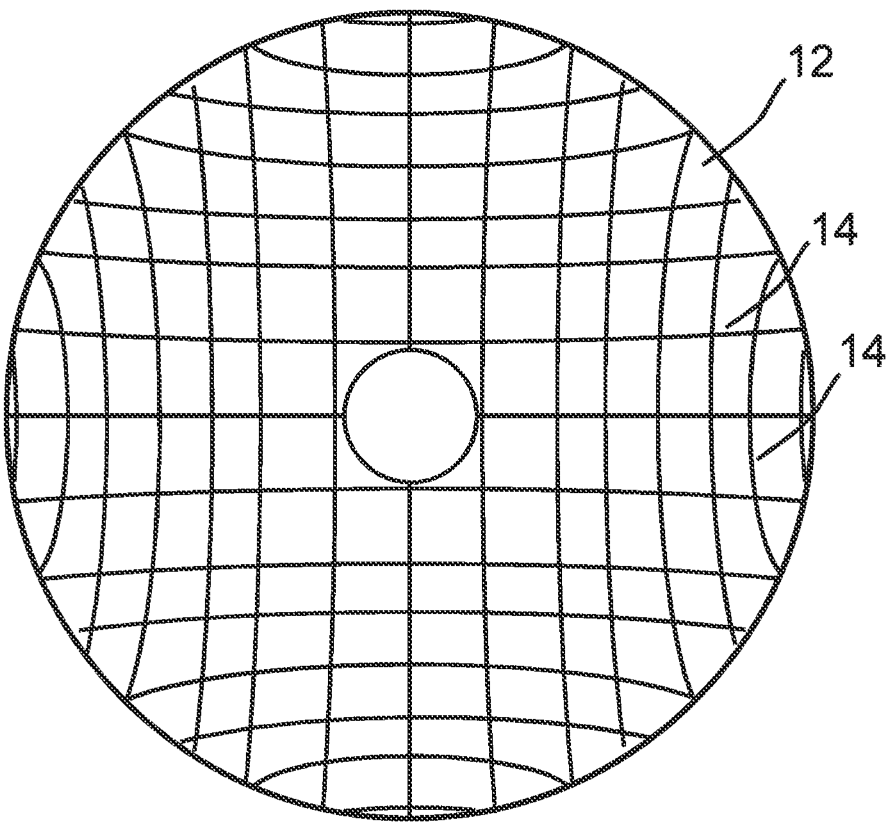
FIG. 2 shows the directions of the fibres of the woven fibre cone of FIG. 1.

FIG. 1 shows a hi-fi loudspeaker enclosure 2 in the form of a generally cuboidal cabinet 4. The cabinet 4 accommodates a mid-range/bass drive unit 6, and a tweeter 8. The loudspeaker is vented by means of a forward-facing port 10. The drive unit 6 comprises a cone-shaped diaphragm 12, having a generally concave shape as viewed front-on (as shown in FIG. 1). The diaphragm has a diameter of about 150 mm (a 6 inch drive unit) and operates over frequencies ranging from 20 Hz to 6 kHz. The diaphragm is formed from a woven fibre cone, as shown schematically in FIGS. 2 and 3, which show respectively the cone front-on and as a side view. Thus, there are adjacent lengths 14 of fibre running approximately parallel to each other that weave in and out of other corresponding adjacent lengths of fibre running transverse thereto, to form a woven mat. The lengths 14 of fibre material are curved and cross at different angles to each other in order to define the desired (concave) conical shape of the diaphragm. The diaphragm 12 defines a forward-facing sound-radiating surface and a rearward-facing surface which supports a damping material. FIG. 2 shows the lengthwise extent of some only of the lengths 14 of fibre, illustrating the non-linear shape that the lengths of fibres of the diaphragm 12 have.

Figure 3:
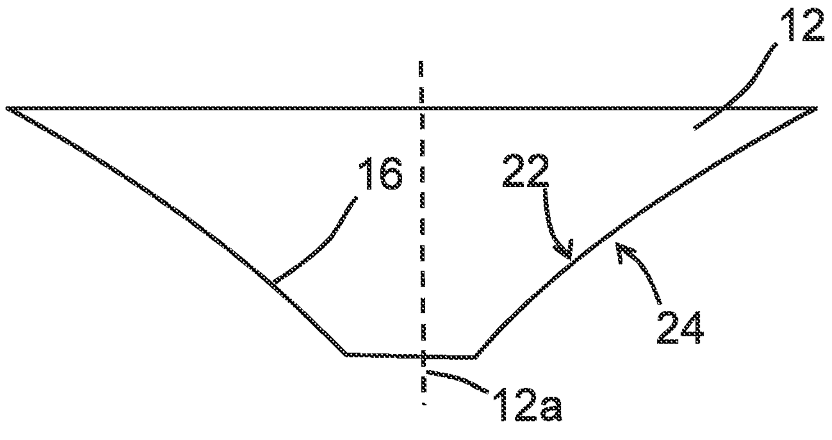
FIG. 3 shows a side view of the cone of FIG. 1.

It will be seen from FIG. 3 that the generally concave shape of the cone-shaped diaphragm 12 is formed by a wall extending 360 degrees around a central axis 12*a*, the wall 16 having a shape which when viewed in cross-section has a gently curving convex shape. FIG. 3 also shows the forward-facing sound-radiating 22 (as visible also in FIG. 1) surface and the rearward-facing surface 24 of the diaphragm.

Figure 4:
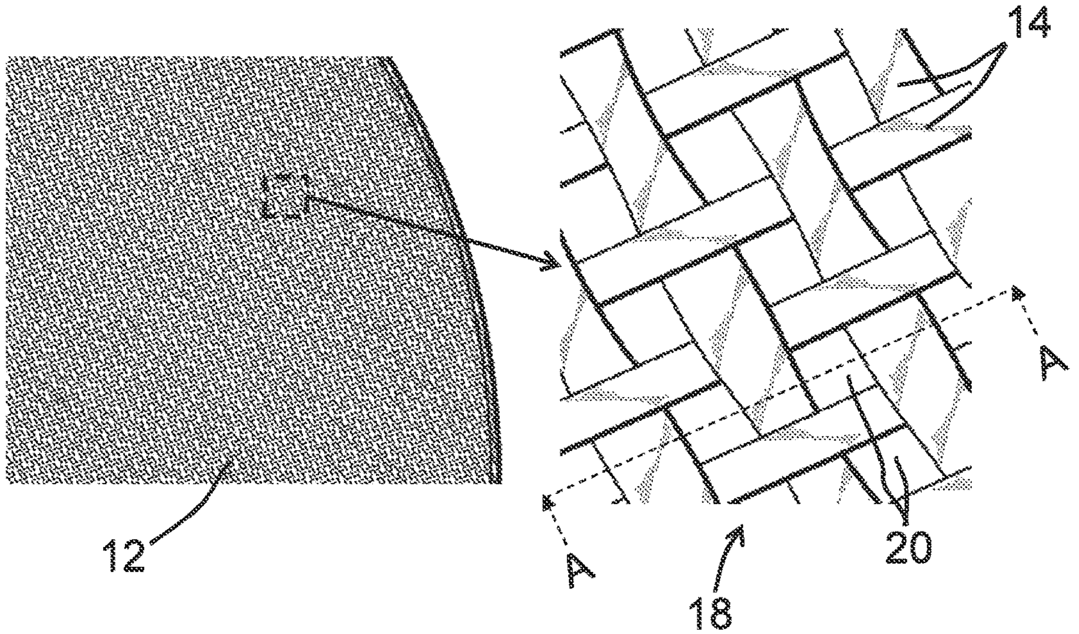
FIG. 4 includes a close-up view of a portion of the woven fibre cone of FIG. 1.
Figure 5:
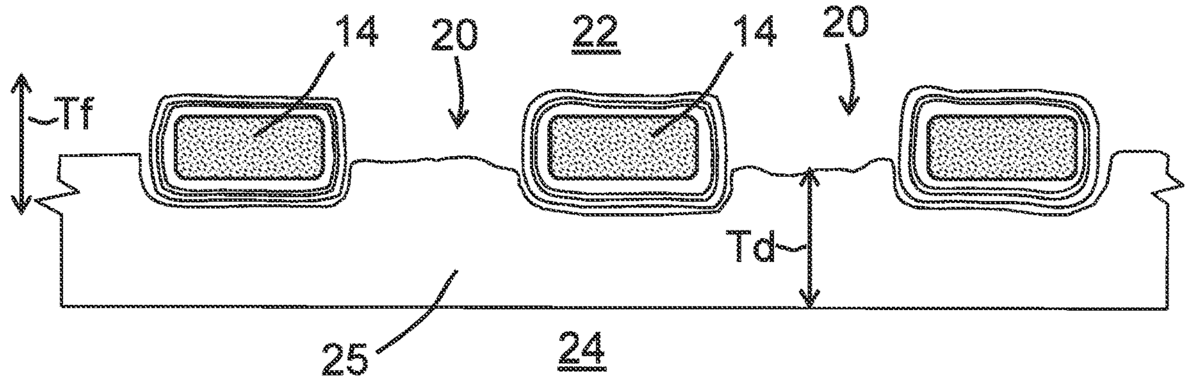
FIG. 5 is a cross-sectional view of the portion of the woven fibre cone shown in FIG. 4 taken across the plane represented by line A-A in FIG. 4.

FIG. 4 shows the cone 12 and a magnified view 18 of a section thereof. As will be seen from FIG. 4, the respective lengths 14 of fibre are woven together, with a relatively open weave such that there are spaces 20 between the adjacent general-parallel lengths 14 of fibre running in a given direction. FIG. 5 shows, highly schematically, three parallel lengths 14 of the fibre material in cross-section, the cross-section being taken along the line A-A as shown in FIG. 4. The forward-facing sound-radiating 22 surface is at top of FIG. 5 whereas the rearward-facing surface 24 is at the bottom of FIG. 5. The layer of the woven glass fibre material has a thickness $T_f$ of about 0.2 mm to 0.3 mm. The rearward-facing surface 24 of the diaphragm supports a layer of damping material 25, which fills the spaces 20 between the woven lengths 14 of fibre. The damping material is in the form of a cured PVA polymer and has a mass of about 240 g/m$^2$. It has an average thickness $T_d$ which is not very different from the thickness $T_f$ of the glass fibre layer, being about 0.2 mm to 0.3 mm. The cured PVA layer 25 fills the gaps 20 between the lengths 14 of fibre material and thus acts as a sealant (the cone would be porous without it).

Figure 6:
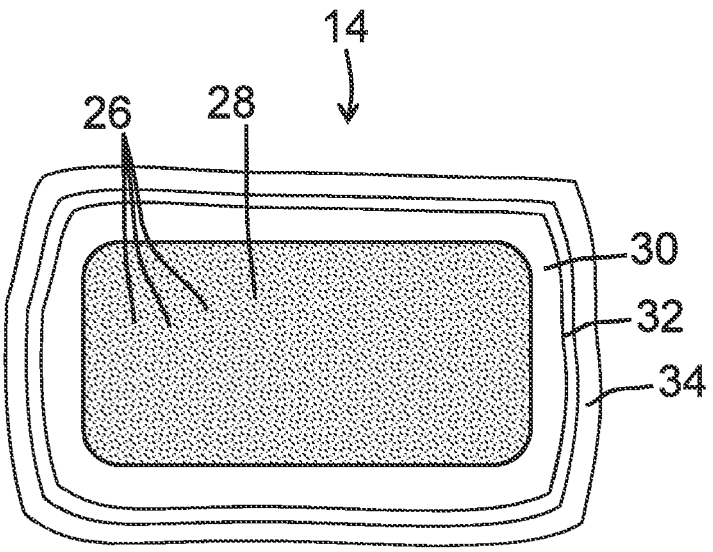
FIG. 6 is a close up cross-sectional view of one of the length of material of FIG. 5.

An individual length 14 of fibre material is shown in cross-section in FIG. 6. The length of fibre material comprises a collection of individual glass fibres 26 (not shown individually in FIG. 6) arranged in parallel to form a thread 28. The woven glass fibres have an open weave with a mass density of about 120 g/m$^2$ (when dry).

The gaps 20 between the lengths 14 of fibres have a width of about 400 to 500 μm. The fibres 26 forming the thread 28 are embedded in a resin matrix 30, which on its outer surface is coated in a thin layer of Aluminium 32 which in turn is protected by a layer of lacquer 34. The amount of resin used per unit area is by itself less than ideally required to provide the preferred amount of stiffness in the glass fibre layer. The layer of lacquer 34 however contributes to the stiffness of the woven fibre material and has a mass that whilst lower per unit area than the resin is still of the same order of magnitude. The mass per unit area of the resin and lacquer together will typically be in the range of 20 to 60 g/m$^2$ depending on the particular application. (The woven glass fibres including the resin and lacquer thus have a mass density of the order of about 160 $g/m^2 \pm 20$ $g/m^2$). The layer 32 of Aluminium is about 0.1 μm thick and therefore has a mass that is negligible compared to the mass of the other component materials of the diaphragm. The presence of the layer 32 of Aluminium provides opacity without which the PVA layer 25 behind and/or the resin matrix 30 around the glass fibre threads could be exposed to more light and/or be more visible than would be desirable. The Aluminium layer 32 has a silver appearance and provides a shiny highly reflective outer surface to the threads. With the weave of the threads, incoming light is reflected in various different directions, giving the diaphragm a sparkly or twinkly appearance. The warp and weft catch the light in different ways, which also contributes to the visually striking appearance. Furthermore it may be that a slight shift in viewing angle has a noticeable effect on the way in which light is reflected, which also results in the diaphragm having unusual optical properties and appearance for a speaker diaphragm particularly when viewed with two eyes and/or with slight relative movement between viewer and diaphragm.

The amount of PVA damping material used in the embodiments described herein provides improved performance of the diaphragm in relation to mechanical resonances (also described as break-ups). Dealing appropriately with mechanical resonances is very important to the performance of the loudspeaker diaphragm. For lower frequency units, operating at frequencies up to about 500 Hz, one can design a cone with mechanical resonance out of band by selecting the correct shape and material. The material specific modulus (Young's modulus divided by density) is a good metric to quantify the stiffness of a structure. By choosing a high specific modulus material (like aluminium or carbon fibre), the cone break-ups are pushed well above 500 Hz and the unit therefore behaves only in a piston-like manner. In the case of midrange or bass-midrange drive units, the problem is not so easily dealt with, as these units have to cover a wide range of frequencies, from 20 Hz to 6 kHz for example, which makes it more difficult to design a cone which does not exhibit break-ups in this (wide) band. The non-isotropic nature and other mechanical properties of Kevlar weave of the prior art diaphragms have been used to reduce the problems associated with break-up modes in the frequency range of operation.

Figure 7:
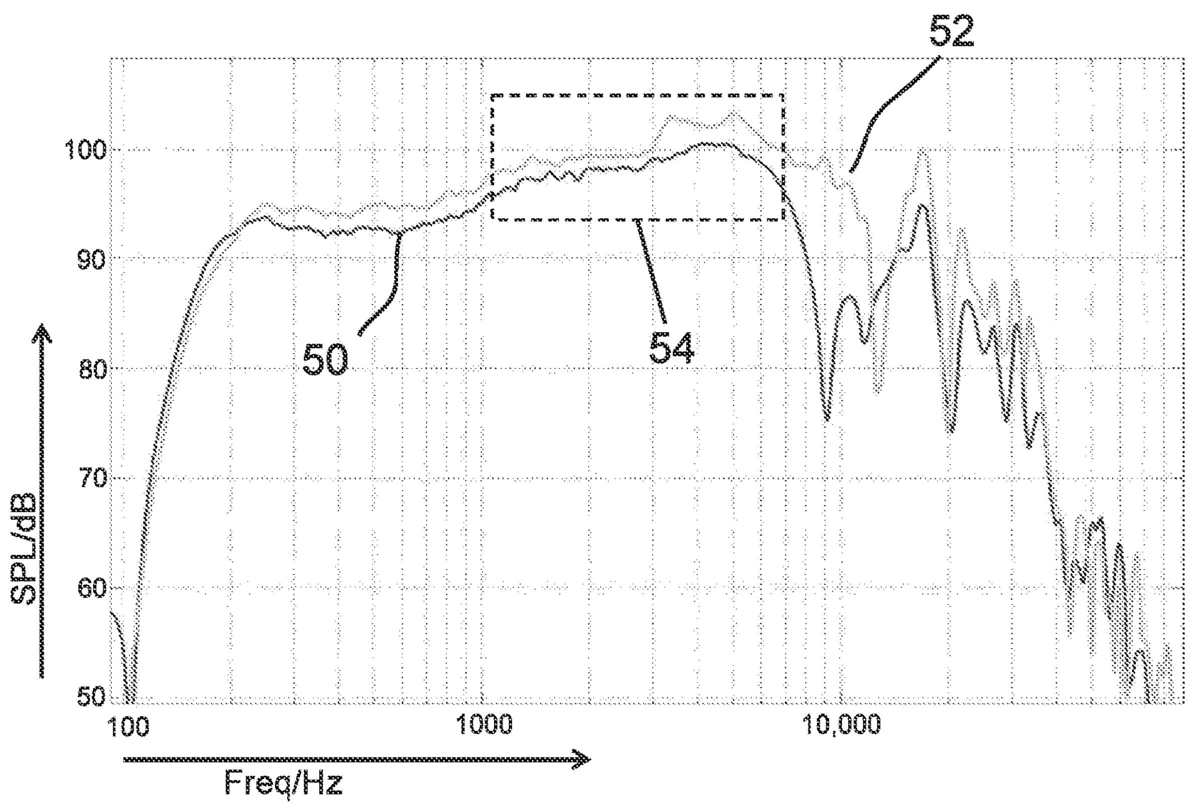
FIGS. 7 and 8 show frequency response curves comparing the acoustic performance of the loudspeaker of FIG. 1 with a comparable loudspeaker of the prior art.
Figure 8:
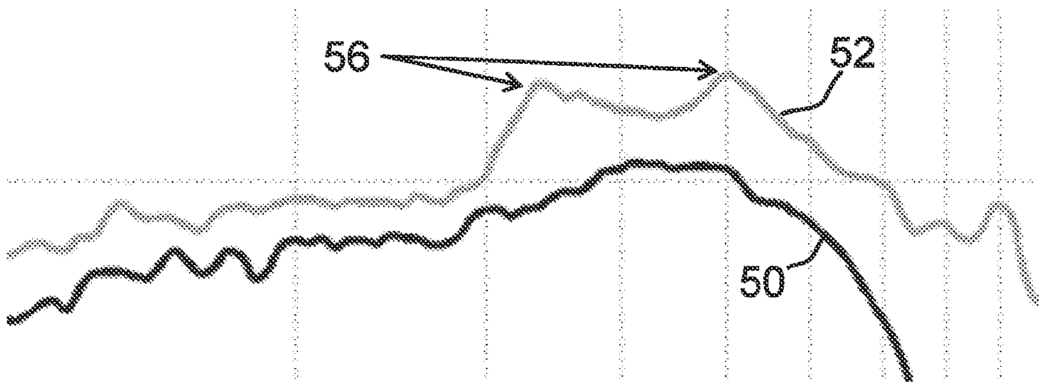

FIG. 7 shows a frequency response curve 50 as a graph of the sound pressure level (along the y-axis) measured by a microphone position along the axis of the diaphragm of the first embodiment at a distance of 1 meter from the plane of the outer diameter of the diaphragm, with increasing frequency of sinusoidal input signal (along the x-axis). To allow comparison, a corresponding frequency response curve 52 is also shown on the graph for a loudspeaker using B&W's Kevlar cone of an equivalent diameter, the loudspeaker otherwise being identical in all respects. A portion 54 of the graph of FIG. 7 is shown the enlarged view of FIG. 8. It will be seen from FIGS. 7 and 8 that whilst the frequency response curve 52 of B&W's Kevlar cone is relatively flat, over the 200 Hz to 6 kHz range, there is room for further improvement. PVA-based damping material is used already in the (prior art) Kevlar diaphragm to provide damping, but the present embodiment proposes a much higher amount, and in conjunction with a glass-fibre woven cone rather than one made from Kevlar. Perhaps surprisingly, the use of glass fibre instead of Kevlar fibre, when coupled with use of much greater amounts of PVA material, is able to yield better results. Thus, it will be seen that the frequency response of the diaphragm of the first embodiment (see curve in FIG. 8) compares favourably with the frequency response of the Kevlar diaphragm (see curve 52 in FIG. 8). The frequency response of the Kevlar diaphragm has two peaks 56 at around 3.5 kHz and 5 kHz, whereas the frequency response of the diaphragm of the first embodiment is flatter at such frequencies. It will also be seen from FIG. 7 that the frequency response of the diaphragm of the first embodiment (see curve 50 in FIG. 8) is as flat as the frequency response of the Kevlar diaphragm at lower frequencies (see curve 52 in FIG. 8).

The type of highly damped polymer material to be used, such as PVA material, may exhibit a high mechanical loss factor (above 0.5) in the frequency bands of interest (in the above-described first embodiment at around 3.5 kHz and at around 5 kHz). The mechanical loss factor can be measured by means of a DMTA (dynamic mechanical thermal analysis) test. Such a test is conveniently conducted at 25 degrees Celsius.

Figure 9:
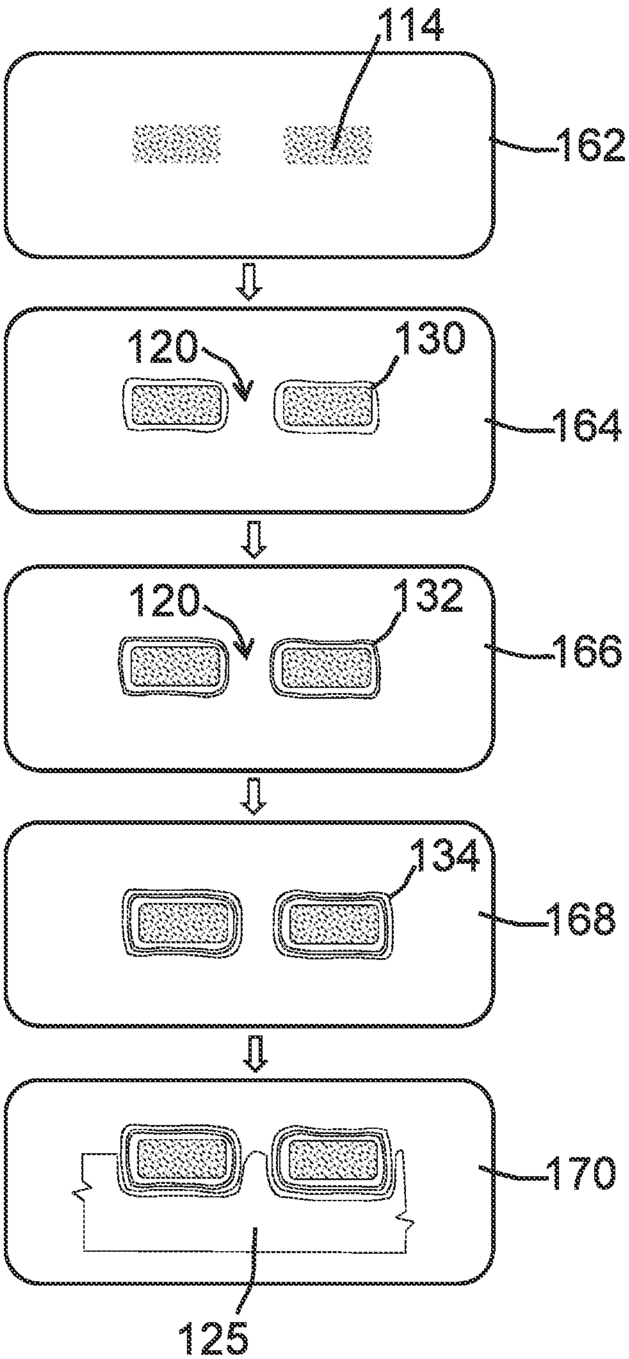
FIG. 9 is a flow chart illustrating a manufacturing method according to a second embodiment of the invention.

FIG. 9 shows a flow-chart illustrating the method according to a second embodiment of the invention. Thus, as a first step 162 a woven disc-shaped glass fibre mat is provided, in which lengths 114 of bundles of aligned glass fibres are woven to form the fibre material mat. As the next step 164, this fibre material is then coated with resin, so that the fibres are coated with (and partially pre-impregnated with) with an uncured resin 130 (thus forming a "pre-preg" mat). The resin-coated mat is then heat-treated in a vacuum-forming mould apparatus, using a mould that causes the shape of the resulting resin-infused glass fibre mat to take on the cone-shape required of the diaphragm. Gaps 120 remain between the lengths of the resin-infused bundles of glass fibres, in the product once the resin is cured. During the next step (box 166 in FIG. 9), a metal-vapour deposition system is then used to apply an Aluminium coating 132 to the lengths of fibres. The metal coating then has a lacquer 134 applied, using a lacquer spraying system (step 168). A thick layer of PVA material 125 is then applied to the rear surface of the cone of material using a cone-spinning application system, which is described in further detail below (step 170). The cone is then trimmed, and integrated into a loudspeaker drive unit in a manner that is conventional in the art.

The result of the cone-spinning PVA application step 170 is the deposition of a large amount of PVA in liquid form (PVA held in a water-based emulsion) on the back of an inverted cone, using the centrifugal force to spread the liquid over the cone surface. This is achieved as follows. A continuous bead of liquid (PVA) is extruded and deposited in a spiral path on the rear surface of the cone of material, which is rotating at a slow speed (less than 100 revolutions per minute). An air flow is used to disperse the liquid onto the cone surface creating a continuous unbroken coverage of liquid on the cone. The air flow used also urges the PVA into the gaps in the weave of the woven fibre material. The cone is then spun at high speed in a two stage process as follows. The 1st phase of the spin is to try and smooth out the PVA across the cone prior to the 2nd phase. The 1st phase of spinning aim to remove any islands of non PVA, in order for the 2nd phase to spin properly. The speed of rotation of the 1st phase is about 150 rpm and lasts for approximately 5 seconds. The 2nd phase of the spin is at 750 rpm for about 5 seconds (but might need to be longer in duration for larger diameter cones). These high speed rotation stages have the surprising effect of smoothing out the PVA over the surface of the cone and providing a clean finish with a relatively constant thickness of PVA across the whole area of the cone. The PVA is then promptly cured at about 65 degrees Centigrade to dry the liquid such that it can be handled and to reduce the risk of the PVA flowing and losing its shape. A relatively low air temperature (<100° C.) is used to cure the PVA so as to reduce the risk of the water in the emulsion from boiling. In the present embodiment, the PVA polymer used has a loss factor of over 0.5 at 5 kHz at 25 degrees Celsius. The PVA layer is deposited so that it forms ⅔ (two thirds) of the total mass of the cone. Having a cone in which the PVA layer forms significantly more than half the mass of the cone provides a particularly beneficial level of damping, as mentioned above. The PVA layer acts like a free-layer damping system but also acts to seal the diaphragm (the cone would be porous without it).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

It is stated above that having a cone in which the PVA layer forms significantly more than half the mass of the cone provides a particularly beneficial level of damping. It will be understood that the PVA layer forming 62.5% or more of the mass of the cone would be judged as significantly more than half the mass of the cone provides a particularly beneficial.

The constant thickness of the PVA coating is not necessary. Indeed there may be advantages in providing a PVA coating having a varying thickness.

Materials other than PVA, such as other synthetic resin elastomeric materials having high mechanical loss, may be used provided they yield appropriately high losses at relevant frequencies. Materials having a high viscosity and high hysteresis may be suitable alternatives. The vinyl resin-based thermoplastic material sold as Cone Edge Dampener E-5525 by the Barrett Varnish Co may be a suitable alternative. Another potential candidate is PVB (Polyvinyl Butyl) which is also available as an emulsion and exhibits good damping properties.

Rather than using the PVA application method that utilises a spinning cone, polymer could be applied by brushing, sponging, or otherwise adding, successive layers of polymer. Many layers may be required to achieve the required thickness.

The term "woven material" (for example in the context of "woven fibre material") is used herein to include any material which is formed from threads or lengths of material which are woven, knitted, or otherwise arranged in an interlinking fashion to form a fabric having a mesh-like structure with spaces between, the threads (or lengths of material) forming the main sub-structure of the material. Whilst in the described embodiments, the material used is in the form of a woven glass-fibre fabric, other woven or knitted materials may be used. For example, embodiments of the invention may have application wherein the fibre material is made from an aramid (aromatic polyamide) fibre or similar materials, such as Kevlar, for example.

The resin with which the woven fibre material is impregnated (that resin used as the stiffening material) may be a synthetic resin, for example, a phenolic, epoxy or melamine resin. However, any other flexible heat-resistant thermosetting resin or high-temperature thermo-plastic resin material may be used. In some embodiments, the mass per unit are of the resin may be between 15 to 40 g/m$^2$ or 2.5 to 40% of the mass of the damping material.

Before describing additional variations on the loudspeaker diaphragm, a discussion of the design constraints is provided. Electrodynamic transducers, such as the loudspeaker diaphragm, rely on the concept of rigid piston to convert an electrical signal into an acoustic pressure, partially because the acoustic radiation of a vibrating piston can be described using analytical equations. However, because a practical implementation of this concept typically uses materials with finite stiffness, mechanical resonances naturally occur in the assembly (which are sometimes referred to as 'break-up modes').

At the mechanical resonance frequencies, the acceleration of the loudspeaker diaphragm is not uniform across the cone surface (i.e., the points on the cone surface are no longer all moving in phase). Instead, the cone surface may have nodes and antinodes, such as in the case of the modes of vibrations of a circular membrane. Therefore, these mechanical resonances create peaks and dips in the acoustic responses, both on-axis and off-axis (so the transducer power response is also affected). Moreover, because most materials have very little inherent mechanical damping, the pressure magnitude is often high at the break-up frequencies.

Typically, a transducer may be designed to move or put the mechanical resonances out of band (such as below 100 Hz and above 10 kHz) by making the assembly very stiff, in the hope that the high-Q mechanical resonance(s) will not be audible.

The loudspeaker diaphragm (which is sometimes referred to as a 'continuum cone') may address these challenges by using a cone structure is unusually compliant. From a mechanical point of view, this means that the loudspeaker diaphragm may only behave as a rigid piston at relatively low frequency (e.g., up to about 1 kHz for 5 or 6 inch diameter cones). Above this frequency range, the loudspeaker diaphragm may exhibit break-up modes that are controlled by adding mechanical damping (as quantified by the structure loss factor) to the structure or assembly. For example, in some embodiments the base structure in the loudspeaker diaphragm may be made of a low stiffness (such as a Yong's modulus of 20-140 GPa), open glass fibre weave. Moreover, the loudspeaker diaphragm may include a thick layer of high-damping material (such as a polymer, e.g., PVA) applied to the glass weave. Furthermore, the material mass ratio in the loudspeaker diaphragm may be 20-40% glass and 60-80% PVA. In some embodiments, the material to mass ratio is around 33% glass and 66% PVA.

The compliance of the base glass structure may enhance the performance of the loudspeaker diaphragm because a compliant structure may be easier to damp than a stiff one. For example, for a sandwich material, as is the case in several embodiments, the composite loss factor may be a function of the mechanical modulus ratio of both of the layers. In other words, for a given damping layer, the composite loss factor may be reduced as the base layer stiffness is increased.

Moreover, the stiffness of the composite structure in the loudspeaker diaphragm may be chosen to minimise the radiation of the break-up modes. This may be related to the relationship between the mechanical wavelength in the material (which, in turn, may be related to the composite modulus and density) and the acoustic wavelength at the same frequency. The composite modulus and density may be chosen to minimise the resonance radiation and the added damping may further dampen the amplitude.

In variations on the loudspeaker diaphragm, a variety of materials may be used for the base material, including: EO823 glass weave, glass, Kevlar, quartz fibre, a woven carbon fibre composite, etc.

Moreover, a variety of materials may be used for the high-damping material, including a PVA composite based on glass microspheres (GMS). This PVA-GMS composite may include PVA heavily loaded with hollow GMS (e.g., a volume ratio of 35-55% PVA to 45-65% GMS, such as 45% PVA to 55% GMS) to form a tight network of GMS connected together with PVA. The GMS may have an average diameter between 20-60 μm, such as 40 μm. Furthermore, the PVA-GMS composite may have: a composite modulus similar to the low stiffness open glass fibre weave impregnated with PVA; and a low volume density of 0.6-0.8, e.g., 0.7 (which corresponds to a sphere packing density around 60%). Note that the PVA-GMS composite may have a topology leading to a mix of shear and tensile strain for the PVA during deformation (because the PVA is deforming between the stiff spheres). This may lead to higher levels of damping than designs in which tensile deformation dominates. Additionally, note that the PVA-GMS composite may be fabricated by mixing the PVA emulsion with the GMS, and then brushing or spraying the mix on a substrate. In some embodiments, the thickness of the PVA-GMS composite is between 0.2-0.4 mm. The PVA-GMS composite may have very low harmonic distortion (such as a third harmonic distortion of less than −50 dB, e.g., −60 dB or 0.1%) because the damping may reduce strain amplitudes and, this, nonlinearities, and may facilitate a reduced cone mass.

In some embodiments, the PVA-GMS composite may use a wider range or distribution of microsphere diameters in order to increase the packing ratio. This may further decrease the density. Moreover, the microspheres may include a stiff material, such as ceramic or diamond. For example, the microspheres may include: silicon chromium, diamond SP3, aluminium oxide ($Al_2O_3$), boron carbide ($B_4C$), etc. This may increase the microsphere to PVA stiffness ratio, which may result in more strain concentration in the PVA and, thus, in more damping. Furthermore, the microsphere surface may be chemically functionalised to improve the PVA-to-microsphere interface (and, thus, to improve the cone strength).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A loudspeaker diaphragm, comprising:

the diaphragm has a forward-facing sound-radiating surface and a rearward-facing surface;

the diaphragm comprises a woven fibre body which supports a damping material such that the woven fibre body forms the forward-facing sound-radiating surface of the diaphragm and the damping material forms the rearward-facing surface of the diaphragm;

the woven fibre body is formed of lengths of fibre which weave in and out of each other, such that there are a plurality of gaps between adjacent lengths of fibre of the woven fibre body, and the damping material fills substantially all of the plurality of gaps; and the fibres forming the woven fibre body are integrated within a cured resin matrix, which contributes to the stiffness of the woven fibre body.

2. A loudspeaker diaphragm according to claim 1, wherein the plurality of gaps between adjacent lengths of material define an array of gaps, each of the plurality of gaps having a maximum dimension that is at least 50 microns.

3. A loudspeaker diaphragm according to claim 2, wherein each of the plurality of gaps has a maximum dimension that is at least 100 microns.

4. A loudspeaker diaphragm according to claim 1, wherein the damping material has a mechanical loss factor of at least 0.25 at a frequency between 1 kHz and 8 kHz.

5. A loudspeaker diaphragm according to claim 1, wherein the mass of the damping material in in the range of 100 to 500 g/m$^2$.

6. A loudspeaker diaphragm according to claim 1, wherein the woven fibre body is formed of non-metallic fibre material having a metal coating.

7. A loudspeaker diaphragm according to claim 6, wherein the metal coating of the non-metallic fibre material presents a reflective surface at the forward-facing sound-radiating surface.

8. A loudspeaker diaphragm according to claim 6, wherein the woven fibre body includes a layer of lacquer over the metal coating, the layer of lacquer both protecting the metal coating and contributing to the stiffness of the woven fibre body.

9. A loudspeaker diaphragm according to claim 1, wherein the woven fibre body includes a layer of lacquer which contributes to the stiffness of the woven fibre body.

10. A loudspeaker diaphragm according to claim 9, wherein the mass per unit area of the resin is greater than the mass per unit area of the lacquer by a factor of 5 or less.

11. A loudspeaker diaphragm according to 9, wherein the mass per unit area of the resin and lacquer together is in the range of 20 to 60 g/m$^2$.

12. A loudspeaker diaphragm according to claim 1, wherein the diaphragm has a diameter of at least about 50 mm and no greater than about 200 mm.

13. A loudspeaker diaphragm according to claim 1, wherein the mass of the damping material is more than 95% of the mass of the woven fibre body.

14. A loudspeaker diaphragm according to claim 1, wherein the damping material is a synthetic resin elastomeric material.

15. A loudspeaker diaphragm according to claim 1, wherein the damping material is Polyvinyl Acetate material.

16. A loudspeaker diaphragm according to claim 1, configured for use as a midrange drive unit for a hi-fi loudspeaker.

17. A loudspeaker diaphragm according to claim 1, wherein the diaphragm has a range of operation over a band of frequencies, the diaphragm has a stiffness such that without the damping material the diaphragm would not exhibit break-up behaviour at frequencies below 500 Hz, but would exhibit break-up behaviour at certain frequencies above 500 Hz but still within the band of frequencies of the range of operation, and the damping material is configured to damp the break-up behaviour at the certain frequencies.

18. A loudspeaker diaphragm according to claim 1, wherein the damping material has a mechanical loss factor of at least 0.25 at a frequency between 1,000 Hz and 8,000 Hz, a stiffness of the woven fibre body results in a structure that is compliant and which behaves as a rigid piston at frequencies less than 1,000 Hz, and break-up modes, which occur at frequencies extending up to 6,000 Hz, are damped by the damping material.

19. A method of making a loudspeaker diaphragm according to claim 1, wherein the method comprises a step of applying liquid damping material to a spinning woven fibre body.

20. A loudspeaker drive unit comprising a diaphragm according claim 1.

21. A loudspeaker enclosure comprising a loudspeaker drive unit according to claim 20, wherein the loudspeaker drive unit is configured as a midrange drive unit and the loudspeaker enclosure is additionally provided with a tweeter drive unit.

22. A method for making a loudspeaker diaphragm comprising:

spinning a woven fibre body, the woven fibre body having an open weave which defines a plurality of gaps forming an array of gaps, the woven fibre body having a cured resin matrix which contributes to the stiffness of the woven fibre body;

applying liquid damping material to the spinning woven fibre body, the liquid damping material flowing into and filling substantially all of the plurality of gaps of the array of gaps; and curing the liquid damping material so that the damping material transforms from a liquid material to a non-flowing material.

* * * * *